Feb. 27, 1962 W. T. RENTSCHLER 3,022,714
PHOTOGRAPHIC CAMERA
Filed Sept. 14, 1959 4 Sheets-Sheet 1
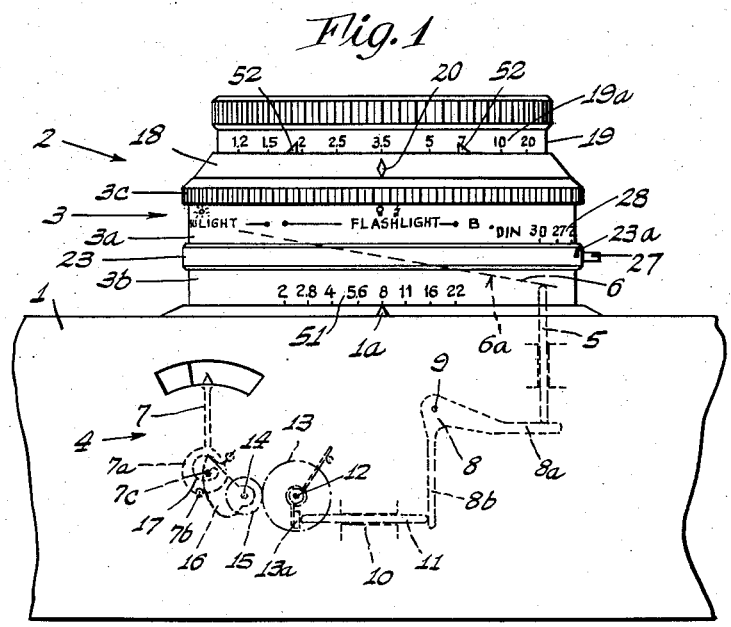
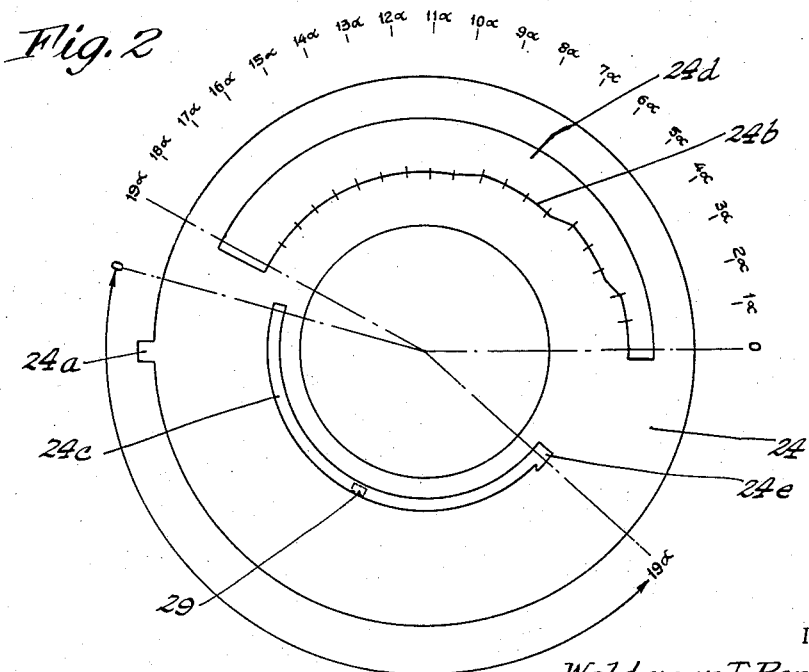
INVENTOR
Waldemar T. Rentschler
BY
Munn, Liddy, Daniels & March
ATTORNEY Feb. 27, 1962 W. T. RENTSCHLER 3,022,714
PHOTOGRAPHIC CAMERA
Filed Sept. 14, 1959 4 Sheets-Sheet 2

INVENTOR
Waldemar T. Rentschler
BY
Munn, Liddy, Daniels & March
ATTORNEYS

Feb. 27, 1962  W. T. RENTSCHLER  3,022,714
PHOTOGRAPHIC CAMERA
Filed Sept. 14, 1959  4 Sheets-Sheet 3

INVENTOR
Waldemar T. Rentschler

BY
Munn, Liddy, Daniels & March
ATTORNEYS

Feb. 27, 1962 W. T. RENTSCHLER 3,022,714
PHOTOGRAPHIC CAMERA
Filed Sept. 14, 1959 4 Sheets-Sheet 4
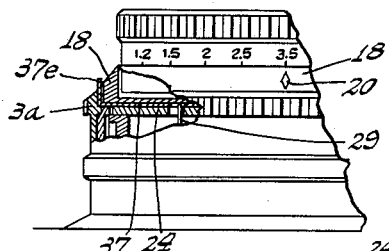
Fig. 10
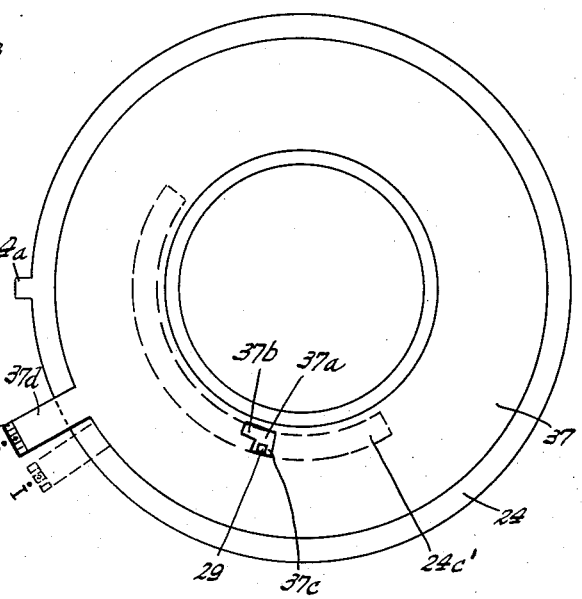
Fig. 11
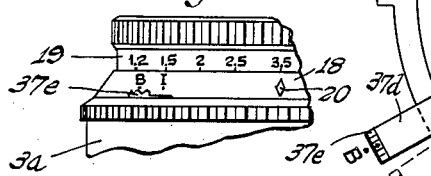
Fig. 12
Fig. 13
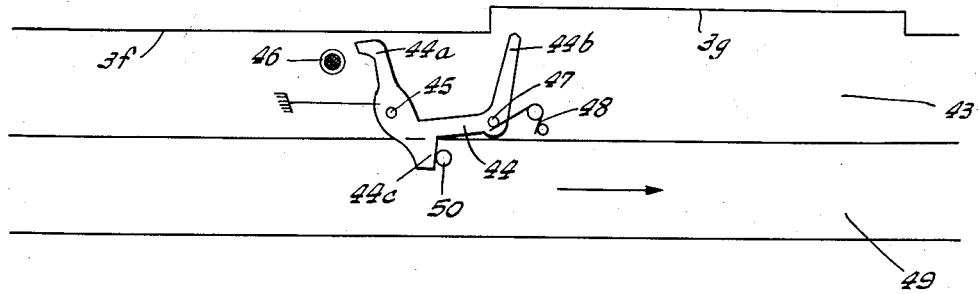
INVENTOR
Waldemar T. Rentschler
BY
Munn, Liddy, Daniels & March
ATTORNEYS 3,022,714
PHOTOGRAPHIC CAMERA
Waldemar T. Rentschler, Calmbach, Enz, Germany, assignor to Alfred Gauthier, G.m.b.H., Calmbach, Enz, Germany, a corporation of Germany
Filed Sept. 14, 1959, Ser. No. 839,819
Claims priority, application Germany Sept. 27, 1958
9 Claims. (Cl. 95—10)

This invention relates to photographic cameras of the type wherein a single exposure-value setting member or device is provided, which influences or actuates the setting devices for the camera diaphragm and shutter speed.

Cameras of this type have been found to give excellent results in the making of daylight exposures, since their operation is characterized by the utmost simplicity and absence of error. The benefit of simplicity of operation is had, moreover, without substantially limiting the useful scope as compared with cameras which have separately adjustable diaphragm and speed setting members. A special advantage of cameras provided with a single exposure-value setting device resides in the fact that the operator need have no knowledge whatsoever regarding the pairing of the speed and diaphragm values, since the automatic correlation or adjustment of these by means of the single exposure-value setting device always insures usable photographs, at least as long as the operator chooses the proper shutter speed or the selected shutter speeds of the camera are suitable for making exposures with the camera held in the hand.

An object of the present invention is to provide a camera of the above type having a single exposure-value setting device, wherein optimal operational simplicity is had for all types of exposures, together with a readily understandable organization by which the best possible photographs will always be had, all with a maximum degree of reliability, these features being obtained while at the same time the structure of the camera is simple and relatively small and compact.

In accomplishing the above object the exposure-value setting device is arranged, and associated with two separate or distinct, setting ranges or scales complete each in and of itself and disposed in succession or one after the other, rather than in overlapping relation considering the direction of adjusting movement of the exposure-value setting member. Each of the said setting ranges or scales has monotonous or uniform exposure-value gradations, one of said setting ranges being intended for use in the taking of daylight pictures and the other being intended for us with flash exposures. Moreover, the said two ranges or scales are preferably distinguished either by special coloring or else by suitable symbols with which they are associated.

A camera as thus constituted by the invention provides important advantages, as compared with well-known cameras of the type before mentioned, while at the same time retaining the operational simplicity which is characteristic of cameras having but a single setting device or member. The present improved camera especially simplifies the setting operations and renders these more easily understood, thereby facilitating the taking of the pictures, and insuring more uniform and reliable results. This result is obtained by effecting a distinct separation of the daylight setting range from the flash-exposure setting range. Such separation produces the advantage that the operator is less likely to be puzzled in effecting the camera setting, as might occur wherein certain specific settings of the exposure-value setting member as required for daylight exposures are duplicated when setting for flash-exposures, which is characteristic of prior cameras of the kind mentioned above. It has been found that the well known and recognized advantages which are inherent in cameras having a single exposure-value setting device are detracted from when duplicate values or settings as above noted must be employed for both daylight and flash pictures, since an operator who has no knowledge of the technical processes involved may find it difficult to understand the mechanism and to readily effect the proper setting at all times.

Such disadvantages and drawbacks are largely obviated in a camera constructed in accordance with the invention. The desirable reliability of such a camera is due to the extraordinary clearness and simplicity of its operation with respect to both the handling of the mechanism and the understanding of the same, this latter factor in particular contributing to the producing of a camera which is virtually foolproof, since by virtue of the present improved construction it is practically unnecessary to understand the mechanics or workings of the setting mechanism.

In addition to the desirable simplicity of operation, ease in effecting the proper settings, and reliability of the settings, the camera as provided in accordance with the invention is characterized by good adaptability to various conditions of exposure, both for the taking of daylight and flash exposure photographs. This is due to the fact that the daylight picture range can be adjusted or arranged exclusively to suit the requirements for daylight exposures, as for example in a manner such that extremely fast shutter speeds are associated with diaphragm openings which provide an acceptable depth of focus. Thus, it is possible to take photographs having the same or virtually the same quality as those taken with cameras wherein separately adjustable setting members are provided for shutter speed and diaphragm.

Similarly, a camera constructed in accordance with the invention can be adapted in the best possible manner to the requirements for flash exposures, since the setting positions of the flash exposure range may be arranged exclusively for carrying out this type of exposure. For this reason the shutter speed which is to be used for flash exposures may be selected quite freely, depending on whether flashbulbs or electronic flash devices, or both are to be used.

In carrying out the invention further there is provided in addition to the above-mentioned setting ranges for daylight and flash exposures, an additional setting position "B" which is associated with the exposure-value setting device and is located either at one of the outer extremities of the two setting ranges or else interposed between the two setting ranges in the transition area therebetween. This increases the useful range of the camera without materially adding to the cost, and enables photographs to be taken with any desired time of exposure, including times required for the taking of night pictures. This further advantage is had without adversely effecting in the least the operational simplicity and clarity of operation of the camera.

In order to further extend the range and manner of operation where "B" exposures are involved, and to enable exposures of this type to be made independently of the position of the exposure-value setting device (as to obtain a more flexible arrangement for "B" exposures with respect to the setting of the camera diaphragm) there is provided by the invention a separate setting device which may be placed in either of two different positions, by means of which "B" exposures may be effected at will, independently of the setting of the exposure-value setting device.

The simplicity and reliability of operation of the present improved camera may be further increased by providing for an automatic adjustment of the exposure-value setting device for daylight pictures in accordance with existing light conditions, through the use of a light responsive measuring device of a kind well known per se.

In order to avoid confusion of the operator when changing from daylight settings to flash settings where an exposure meter is coupled with the exposure-value setting device, and also in order to clearly indicate the respective setting positions of the exposure-value setting device with respect to the two available setting ranges, the exposure meter or measuring device may be automatically disconnected or rendered inoperative at such times that the exposure-value setting member or device is made to leave the daylight range and is shifted to the flash exposure range.

Where, as mentioned above, a separate setting device is provided to enable "B" settings to be had at will, the reliability of operation is further increased by effecting an automatic disconnection of the exposure meter or measuring device at such times that "B" settings are made. This will avoid the possibility of unintentionally taking "B" photographs in the daylight range when the operator intends to take snapshots.

Disconnection of the exposure meter or measuring device may be made in a manner which does not impair the accuracy and functional reliability of the same, and may be simply effected at little cost by the provision of a short circuiting switch connected in parallel with the galvanometer movement of the measuring device, whereby the operating current for such device may be shunted therefrom.

In the case where the automatic setting of the exposure value setting device is effected in a well known manner by bringing about a coincidence between a tracing member or setting mark and the needle or pointer of the exposure meter, the camera as provided by the invention may be adapted very favorably, in a simple and inexpensive manner, for any type of daylight exposure by arranging the control means which is associated with the exposure value setting member and which forms a part of the coupling to the exposure meter (such control means being for example cams or electrical resistances) to provide an automatic exposure value setting over the entire range of adjustment as determined by the remote end points or extremities of the two setting ranges (the daylight and flash exposure ranges).

The resulting advantage is particularly noticeable in closeup views, where the operator may arrive at other depth of focus ranges in the flash exposure range than would result from similar lighting intensities in the daylight range.

In order to avoid the unintentional taking of flash exposures in the daylight range, thereby to increase the reliability of the camera, a control means may be connected with the exposure-value setting member and made to cooperate with the flash exposure contact device of the camera in such a manner that the said contact device is capable of operation for flashbulb ignition only when the exposure-value setting member is in the flash exposure range.

As has already been mentioned, a person operating a camera having the above features is not required to either set or operate the diaphragm, at least when making daylight photographs, since the operation or setting of the exposure value setting device automatically effects the diaphragm adjustment, thereby insuring useable photographs each time that an exposure is made. In order that an operator who has no knowledge of the diaphragm numbers or values may be informed of the depth of focus as effected by the diaphragm setting and the range or distance setting, a camera as provided by the invention may have incorporated in it a well-known device for automatically indicating the depth of focus, and the pointers of such a device may be adjustable in response to the adjusting movement of the exposure-value setting device or in response to the movement of the diaphragm setting device.

The accompanying drawings and the following specification illustrate and describe an embodiment of the invention, in the form of a camera having a photographic intra-lens shutter. The drawings and specification serve to explain in detail the above-identified advantages, as will as other advantages resulting from the invention.

FIG. 1 is a fragmentary top plan view of a photographic camera constructed in accordance with the invention and having an exposure meter incorporated therein, the tracing or settable member of the meter being coupled with the exposure value setting device by means of the mechanical coupling or transmission for the purpose of effecting a semi-automatic exposure setting.

FIG. 2 is a front elevational view of a cam ring for effecting various shutter speeds.

FIG. 10 is a fragmentary top plan and axial sectional view similar to that of FIG. 3, illustrating a separate setting device which is shiftable between two positions and by means of which "B" exposures may be effected at will.

FIG. 11 is a front elevational view of a control ring constituting a portion of the separate setting means for "B" exposures as shown in FIG. 10. There is illustrated in this figure the cooperable relationship between the "B" setting device and an extension arm of a lever for effecting "B" exposures.

FIG. 12 is a fragmentary top plan view of the shutter and lens assemblage, showing the actuating member of the "B" setting device illustrated in FIGS. 10 and 11.

FIG. 13 is a diagrammatic representation of a control device for automatically disconnecting the flash exposure contact mechanism when the exposure value setting device is placed in the daylight range.

Figure 3:
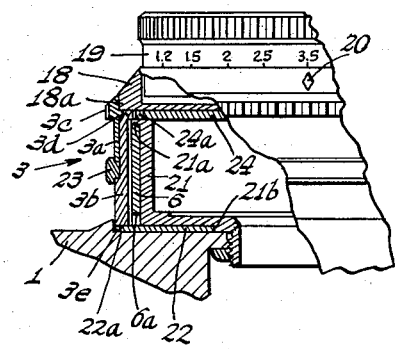
FIG. 3 is a fragmentary view partly in axial section and partly in top plan, of the shutter and lens assemblage shown in FIG. 1, said view illustrating a control member associated with the exposure-value setting device and with the mechanical coupling or transmission between said device and the exposure meter.

Referring first to FIG. 1, the numeral 1 indicates the casing of a photographic camera. Mounted on the casing 1 is an intra-lens shutter assemblage 2 having an exposure value setting device 3. Incorporated in the camera casing 1 is a photo-cell (not shown) and an exposure meter comprising a measuring mechanism or device 4. A transmission is arranged between the measuring device 4 and the exposure-value setting device or member 3, the said transmission including a longitudinally movable pin 5 which is arranged parallel to the axis of the shutter and lens assemblage 2. One end of the pin 5 cooperates with a cam-type control member 6 which is connected to the exposure-value setting device 3 in a manner to be described later.

Movements of the transmission pin 5 are transmitted to a settable tracing member 7 of the exposure meter, by means of a lever or bell crank 8 which is pivotally mounted on an axis 9 carried by the casing 1. One arm 8a of the lever 8 engages the transmission pin 5, whereas the other arm 8b cooperates with a second longitudinally movable pin 11 which is carried in a guide bushing 10. The pin 11 engages a lug 13a which extends perpendicular to the plane of the drawing and is carried by a gear 13 turnable on an axis or shaft 12 and meshing with a smaller gear or pinion 15 carried by a spindle 14. Coaxial with and fixedly secured to the pinion 15 is a cam 16 which engages a cam follower pin 7b mounted on the upper arm 7a of the tracing or settable member 7. The tracing member 7 is pivoted at 7c and is biased in a counterclockwise direction by a spring 17. The spring 17 maintains the cam follower 7b in engagement with the cam 16 at all times.

The setting of the camera for range or distance is done in a well known manner, by a distance setting ring 19 which is provided forwardly of a front plate 18 of the shutter and lens assemblage 2, the setting ring 19, being associated with an adjustable front lens and having a scale 19a which may be referred to a fixed index mark 20.

In order to obtain the greatest possible simplicity and quality of operation, together with a high degree of reliability in a camera of the type described above there is provided in accordance with the invention in conjunction with the exposure-value setting device 3, two separate or distinct setting ranges each of which is complete in and of itself, said ranges being disposed successively with respect to the direction of adjusting movement of the exposure value setting devce. Each of the said ranges has a uniform exposure-value gradation, one of said setting ranges being adapted for daylight exposures whereas the other one is utilized for flash exposures. Further, in accordance with the invention, the said two ranges are preferably distinguished or characterized by special coloring, or else by suitable symbols associated therewith.

A clear or distinct separation of the ranges for daylight and flash exposures in a camera constructed in this manner, results in a very simple and easily understood setting operation since the operator will no longer have to contend with duplication of settings of the exposure value setting device when considering daylight and flash exposures. This simplicity and clarity of operation provides for a high degree of reliability in the taking of pictures, since it is not necessary for the operator to have any technical understanding whatsoever, as regards the setting operations. A camera constructed in accordance with the invention provides not only great simplicity, clarity of operation and reliability, but also excellent adaptability to various photographic conditions, for both daylight and flash exposures. For this purpose, very short exposures or fast shutter speeds may, for example, be associated with a diaphragm opening which will still produce an acceptable depth of focus, as is apparent from the graph set forth in FIG. 9 which shows a specially constructed cam of the control member 6, to which reference will be had later.

As is apparent from FIG. 3, the control member 6 of the exposure meter coupling or transmission is constituted as a ring which is positioned concentrically with the shutter axis and has a bearing on the side wall 21 of the shutter housing. The edge of the ring 6 which faces the camera casing 1 carries a helical cam 6a, as may be seen in FIGS. 1 and 3. The ring 6 is held against axial movement by a front shoulder or flange 21a on the side wall 21 of the shutter housing and by a holding member (not shown) disposed adjacent the rear transverse wall of the said housing.

As also shown in FIG. 3, the exposure-value setting device 3 is constituted as a two-piece ring which is arranged to be concentric with respect to the shutter axis. The two pieces or members 3a and 3b of the ring 3 overlap each other and are fixedly secured together in any suitable manner. To faciiltate the adjustment of the exposure value setting device, a knurled edge 3c is provided on the outer circumference of the member 3a. In addition, a ring 23 is rotatably carried on the outer circumference of the member 3b and held against axial movement. The ring 23 enables the camera to be set for different film sensibility values, as will be described later.

The exposure-value setting device 3 constituted of the two rings or members 3a and 3b is rotatably carried on a cylindrical surface 18a provided on the circumference of the front plate 18. The exposure-value setting device 3 is held against axial movement by means of the flange 21a provided on the front edge of the wall of the shutter housing and by the front plate 18 of the shutter and lens assemblage. The parts 21a and 18 engage an inwardly extended flange or shoulder 3d which is provided on the part 3b of the exposure value setting device, as seen in FIG. 3.

FIG. 3 also shows clearly how the exposure-value setting device 3 is connected to the setting mechanisms for the shutter speed and the diaphragm. A control ring 22 which influences the diaphragm mechanism is rotatably carried on a shoulder 21b at the rear of the shutter housing. The control ring 22 is connected to the exposure-value setting member 3 by means of a lug 22a which is provided on the ring (FIGS. 6 and 7), said lug being received in a notch 3e of the part 3b, thereby to drivingly connect the ring 22 with the member 3. The shutter speed control ring 24 is connected to the exposure-value setting device 3 and positively driven thereby in a similar manner. The ring 24 engages the front edge of the side wall 21 of the shutter housing and has a lug 24a (FIG. 2) which is received in a notch (not shown in the drawing) provided in the inwardly extending flange 3d of the ring 3b. Thus, shifting movement of the exposure value setting device 3 will simultaneously actuate the setting mechanisms for the diaphragm and shutter speed, by way of the control rings 22 and 24.

For the purpose of effecting a semi-automatic exposure value setting, the invention provides between the exposure valeu setting device 3 and the cam ring 6 a coupling device or mechanism by means of which the adjusting movement of the exposure-value setting device 3 is transmitted to the tracing or setting member 7 of the exposure meter 4. The said coupling mechanism is shown in FIGS. 4 and 5, FIGURE 4 showing the two rings 3 and 6 when coupled together, and FIGURE 5 showing the same rings when uncoupled from each other.

As can be seen from these two figures, the coupling means comprises a flexible spring 25 which is attached to the outer circumference of the cam ring 6 and which has an outwardly extended finger 25a at its free end. The finger 25a is arranged to be received in any of a plurality of equi-spaced notches or recesses 26 which are provided in the ring member 3b, thereby producing a driving connection between the exposure-value setting member 3 and the cam ring 6. A manually engageable finger piece 27 is carried by the leaf spring 25 and projects from the cylindrical surface of the exposure-value setting device 3 to enable actuation of the coupling device to be effected; for releasing the driving connection between the cam ring 6 and the exposure-value setting device 3 the finger piece 27 is depressed against the action of the leaf spring 25. With the finger piece 27 depressed, relative adjustment of the cam ring 6 with respect to the exposure-value setting device 3 will enable additional exposure factors to be taken into account, other than the shutter and diaphragm factors, as for example, film sensibility and filter factors. This procedure will be explained in detail below, by giving an example of a setting for film sensibility.

Figure 4:
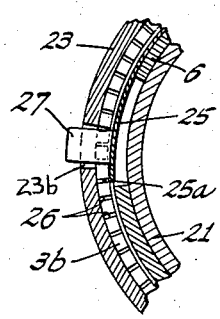
FIG. 4 is a fragmentary transverse section through the shutter and lens assemblage, illustrating the means for coupling the control member with the exposure-value setting device. The driving member or part of the said setting device is in engagement with the said control member.
Figure 5:
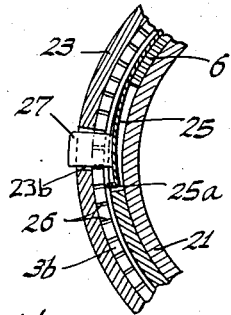
FIG. 5 is a view like that of FIG. 4 but showing the control member as being uncoupled from the exposure-value setting device.

As shown in FIGS. 4 and 5, the finger piece 27 passes through not only the cylindrical ring member 3b but also through an opening or recess 23b in the ring 23. The latter surrounds the finger piece 27 in such a manner that a radial shifting of the finger piece is possible whereas other relative movement between these parts is prevented. Hence, when the coupling is actuated, only the connection between the cam ring 6 and the exposure-value setting ring 3 is released whereas the operable connection between the ring 23 and the ring 6 is maintained. Therefore, any adjustment of the ring 23 with respect to the exposure-value setting device will also be accompanied by a corresponding adjustment or shifting of the cam ring 6.

A coupling means between the exposure-value setting device 3 and the cam ring 6 as thus constituted serves, as shown in the embodiment of FIG. 1, to enable adjustment be made for film sensibility as has already been mentioned. For this purpose, a setting or index mark 23a is provided on the ring 23 (which ring is adjustable with respect to the exposure-value setting device 3). The mark 23a is associated with a film sensibility scale 28 which is carried by the ring member 3a.

In order to enable time exposures to be made, including those involving extended lengths of time, in addition to the taking of snapshots in daylight and the making of flash exposures there is provided in accordance with the invention a "B" setting position for the exposure-value setting device 3, in addition to the two setting ranges for daylight and flash exposures. The "B" setting position may be located at either of the remote ends of the two setting ranges, or else it may be located in the transition area between the two setting ranges. This organization considerably increases the usefulness and utility of the camera. In the embodiment illustrated in FIG. 1, the "B" setting for the exposure-value setting member is located at the remote end of the flash exposure range.

Figure 7:
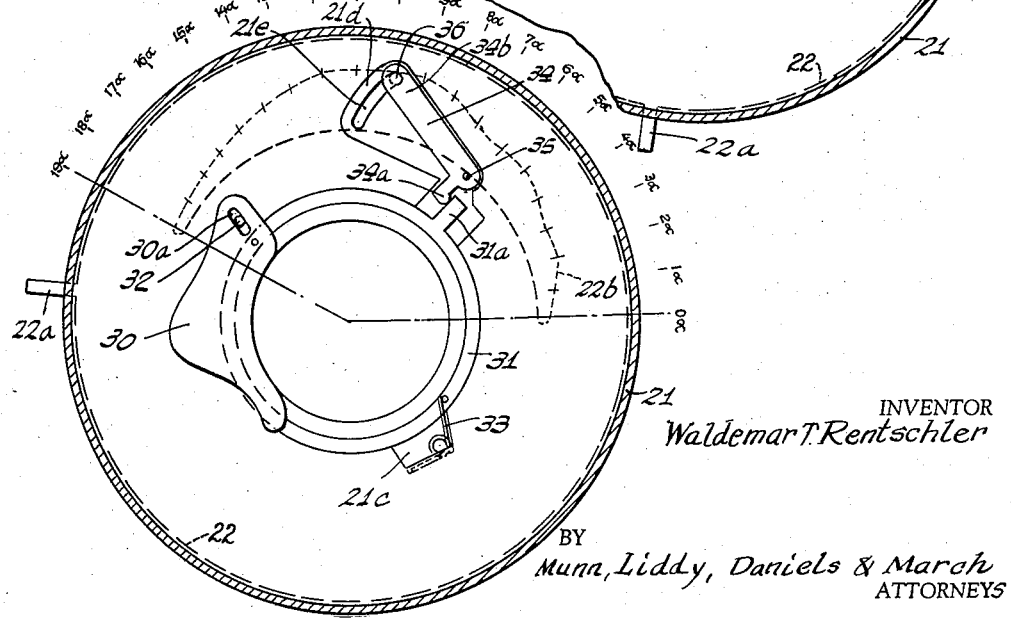
FIG. 7 is a view similar to that of FIG. 6 but showing the diaphragm as being fully opened.

To more clearly illustrate the arrangement of the "B" position and relationship thereof with respect to the cams which control the shutter speed and diaphragm to produce monotonous or uniform exposure-value gradations, and to facilitate an understanding of the operation of the said cams and the association of specific speed and diaphragm values with specified setting positions of the exposure-value ring 3 so as to produce a monotonously gradated exposure-value series, the cams are illustrated as constituted each of a series of angularly extending lines or steps which cover an angular distance or space $\alpha$, as shown in FIGS. 2 and 7. Shifting of the cams through the angular units $\alpha$ thus effects the desired changes in the exposure-value successively producing one exposure value after another.

The cam ring 24 which effects the various desired shutter speeds is clearly illustrated in FIG. 2. This cam ring has an arcuate slot 24d extending circumferentially, the inside edge of the said slot constituting the shutter speed setting cam 24b. As may be observed from the scale or series of angular steps or increments shown in FIG. 2 along the outside edge of the speed setting ring 24, the cam 24b extends over a total range of $19\alpha$. This same range also applies to the diaphragm setting cam 22 shown in FIGS. 6 and 7. The matter of mating the values of speed and diaphragm in each particular case is apparent from the graphic illustration shown in FIG. 9, in which the adjusting path from 0 to $19\alpha$ is drawn or traced as a straight line.

Figure 9:
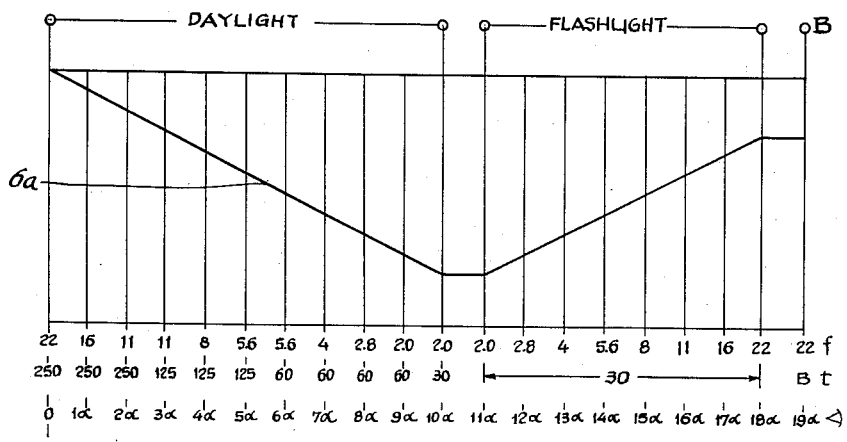
FIG. 9 is a graph showing the development of the cam of the control member which is associated with the exposure meter coupling or transmission device, and further showing the various speed-diaphragm values associated with the said cam for both the daylight and flash exposure ranges.

In FIG. 9 the range from 0 to $10\alpha$ corresponds to the daylight range, and the exposure-times or shutter speeds provided in this range are those especially suited for manually-taken photographs, having in mind the prime purpose of obtaining pictures which are not spoiled by slight movements of the camera. The range from $11\alpha$ to $18\alpha$ comprises the so-called "flash" exposure range, for which there is provided a shutter speed or exposure time of $\frac{1}{30}$ second for all diaphragm gradations. The position $19\alpha$ which is located outside of the flash exposure range corresponds with the setting position "B."

As is clearly apparent from the graph shown in FIG. 9, the mated values of the shutter speed and diaphragm on which the embodiment is based provide the possibility of effecting daylight exposures even in the flash exposure range if desired, with lighting conditions remaining the same, in order to obtain a particularly great depth of focus, as for example when taking close-up views.

To effect "B" exposures, the cam ring 24 has in addition to the shutter speed cam 24b an additional opening or recess 24c (FIG. 2) in the form of an arcuate slot adapted to receive an arm or extension 29 of the control device, associated with the shutter which causes the latter to remain open. The arcuate slot 24c is so arranged that the spring biased arm 29 is locked or held against movement during adjustment of the ring 24 in the range from 0 to $18\alpha$. Only in the position $19\alpha$ is the arm 29 permitted to be shifted, and for this purpose the extremity of the slot 24c is provided with a widened end 24e corresponding to the adjustment $19\alpha$. When the shutter is released, the arm 29 may occupy the notch provided by the widened end 24e, thereby to enable the shutter to remain in its open position.

Figure 6:
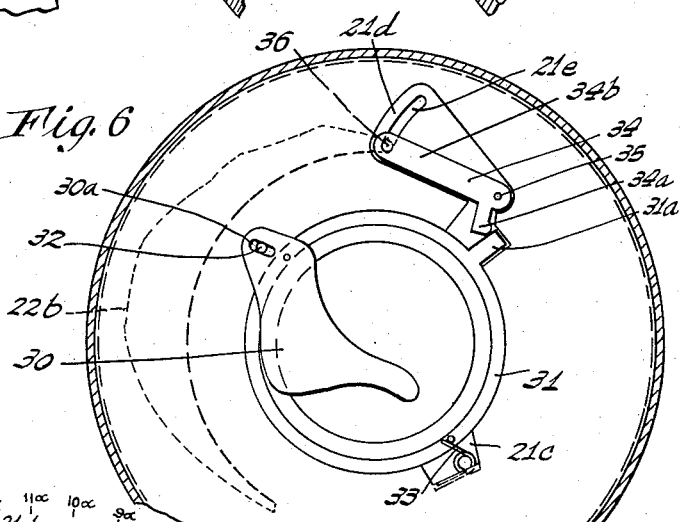
FIG. 6 is a transverse sectional view through the housing of the shutter and lens assemblage, looking rearward, said assemblage having a built-in sector diaphragm which is coupled with the exposure-value setting device by means of a mechanical transmission and is shown as set to its smallest opening.

FIGS. 6 and 7 show a diaphragm adjusting mechanism which is actuated in response to setting of the exposure-value setting device 3. The diaphragm is of the iris type having sectors or segments 30 which are separately cam-controlled in a well-known manner. However, the invention is not limited to this type of diaphragm, as will be understood. FIG. 6 shows the diaphragm mechanism in the position wherein the diaphragm is closed, whereas FIG. 7 shows the positions of the parts for effecting a fully opened condition of the diaphragm.

The diaphragm segments are, of course, provided in the shutter housing and arranged about the axis of the shutter in the usual manner; only one segment 30 is shown in the drawings, for purposes of clarity of illustration. The segments 30 are all connected with an actuating ring 31, and each has a slot 30a through which a fixed pin 32 passes. The diaphragm actuating ring 31 is biased in a counterclockwise direction by a spring 33 which is disposed in a recess 21c provided in the inside of the rear wall of the shutter housing, the said bias maintaining an arm 31a of the ring in engagement with a cooperable arm 34a of a two armed lever 34. The lever 34 is disposed in a second recess 21d provided in the inside of the rear wall of the shutter housing, said lever being pivotally mounted about a fixed axis 35. The remaining arm 34b of the lever 34 carries a cam follower pin 36 which is guided in a slot 21e provided in the rear wall of the shutter housing and which cooperates with a cam 22b connected to the exposure-value setting device 3. The cam 22b is carried by the cam ring 22 which is disposed adjacent the rear wall of the shutter housing and is connected by means of the lug 22a to the exposure-value setting device (which latter is not shown in FIGS. 6 and 7 for reasons of clarity).

As is evident from the figures, the exposure-value setting device 3 and the diaphragm actuating ring 31 are thus connected by an abutting type drive mechanism or transmission involving spring-biased parts, resulting in a simple and inexpensive production of the cam 22b which actuates the lever 34, and resulting in the best possible mobility of the diaphragm.

In carrying out the invention further there is provided a means for enabling "B" exposures to be effected independently of the prevailing position of the exposure-value setting device 3. This means comprises a separate setting device which may be placed in either of two setting positions and by means of which the "B" exposure control for the shutter may remain either operative or inoperative.

Such arrangement and separate setting device is illustrated in FIGS. 10, 11 and 12. As shown in FIG. 11, the separate "B" setting device includes a ring 37 which is positioned as seen in FIG. 10 between the front plate 18 of the shutter and lens assemblage 2 and the cam ring 24 which controls the shutter speed. The ring 37 is concentric with the shutter axis, and has an angle-shaped opening or slot 37a adapted to receive the arm 29 of the well known shutter "B" control mechanism (not shown in the drawings).

As seen in FIG. 11, the slot 37a has a wide portion and a narrow portion (considering a radial direction) the wide portion being designated 37c and the narrow portion being indicated by the designation 37b. The wide portion 37c permits the arm 29 to shift radially outward at the moment that the shutter is released thereby to enable the shutter to remain in opened position in a well-known manner, whereas the narrow portion 37b does not provide freedom of movement for the arm 29 and prevents such radially outward shifting. When the "B" exposure ring 37 is utilized, it assumes complete control of the "B" exposures of the shutter to the exclusion of the shutter speed ring 24, and in order to enable this to occur the opening in the ring 24, which comprises the arcuate slot 24c shown in FIG. 2, is now made uniformly wide, and such wide slot is indicated by the designation 24c' in FIG. 11. Since the wide slot 24c' provides for freedom of movement of the arm 29 at all times regardless of the settings of the ring 24 and exposure-value setting device 3, a "B" setting of the shutter may be effected at any time by appropriate positioning of the "B" setting ring 37, for all setting positions of the exposure-value setting device 3.

For the purpose of enabling the "B" setting ring 37 to be manually actuated an arm 37d is provided thereon, said arm having an angularly bent end or extremity 37e which projects outwardly between the front plate 18 and the ring member 3a of the exposure value setting device 3. Knurling provided on the front edge of the bent extremity 37e serves to facilitate manual actuation of the setting ring 37. Setting of the "B" setting ring 37 is made in accordance with marks in the form of the letters "B" and "I," which are provided on the sloping surface of the front plate 18, the letter "B" indicating to the operator that the shutter is set for "B" exposures whereas the letter "I" is used to indicate the setting of the shutter for instantaneous exposures. As shown in FIGS. 11 and 12, the "B" setting ring 37 is positioned to effect "B" exposures.

A camera constructed in this manner provides greater flexibility in the selection of "B" exposures with respect to the diaphragm settings. However, this advantage is had at the expense of additional structural members, requiring additional space, and also at the expense of reducing to a slight extent the operational reliability of the camera. Therefore, this form of the invention is preferred only in those cases where special emphasis is to be placed on a flexible organization or arrangement as regards the "B" settings of the shutter.

Figure 8:
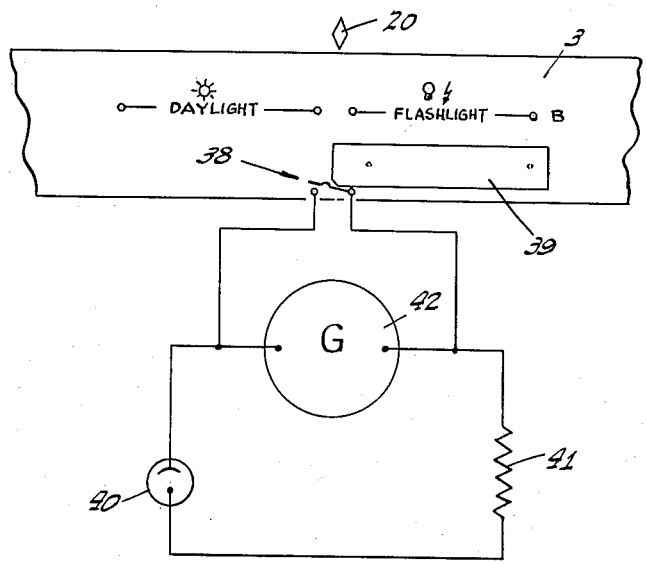
FIG. 8 is a diagrammatic representation of a device for disconnecting or switching off the exposure meter or measuring device thereof, to be utilized when flash exposures are to be made with the exposure-value setting device adjusted to the flash exposure range.

For the purpose of substantially increasing the operational reliability of the camera when changing from daylight to flash exposure settings, and to exclude the likelihood of confusing the operator, the measuring device of the exposure meter incorporated in the camera as illustrated in FIG. 1 may be made automatically disconnectable when the exposure-value setting device 3 is shifted from the daylight range to the flash exposure range.

Where a galvanometer comprises the measuring device of the exposure meter, such device can be readily disconnected without impairing the accuracy thereof and without adding appreciably to the cost of construction, by providing a short circuiting switch which is connected in parallel with the galvanometer for the purpose of rendering the latter inoperative. FIG. 8 is a diagrammatic illustration of such an arrangement.

An electric switch 38 serves to render inoperative the measuring mechanism when the exposure-value setting device is shifted from the daylight range to the flash exposure range. When the switch 38 is closed by means of a switch actuating member 39 provided on the exposure-value setting device 3, the galvanometer 42 which is located in series with the photo-electric cell 40 and a calibrating resistor 41 is short circuited. The member 39 acting on the switch 38 is so arranged that the switch is shifted to its closed position in the transition area between the daylight setting range and the flash exposure setting range, the said switch remaining closed at all times that the exposure-value setting device is in the flash-exposure range as well as in the "B" position at the extremity of such range. The resultant drop in deflection of the pointer of the measuring mechanism draws the attention of the operator to the fact that no daylight photographs are to be taken, but the camera is instead for flash exposures.

Moreover, where the camera is provided with a separate "B" setting device such as the "B" setting 37 described above, there is provided by the invention a means for automatically disconnecting or rendering inoperative the measuring device when the "B" setting ring 37 is shifted into the "B" position. To effect this, for example, the switch 38 may be actuated by a suitable actuating member provided on the "B" setting ring 37. This will help to avoid the unintentional taking of "B" photographs when the exposure-value setting device is in the daylight range, where the operator desires to take instantaneous photographs.

However, the above described arrangement of the switch 38 wherein it short-circuits the galvanometer has the advantage of low cost; in addition, such arrangement does not require interference or interruption with the circuit of the galvanometer, which may under certain circumstances adversely effect the reliability of the measuring mechanism.

In order to avoid the unintentional taking of flash-exposures when the exposure-value setting device is in the daylight range, thereby further increasing the operational reliability of the camera, there is further provided by the present invention a control means which is actuated by the exposure-value setting device and which prevents the flash exposure contact device of the camera from being operative when the setting device is not adjusted in the flash exposure range.

This is accomplished in a simple and inexpensive manner, by an organization which is illustrated diagrammatically in FIG. 13. This figure shows the exposure-value setting device 3 as having the two successively arranged setting ranges identified by exposure symbols for daylight and flash exposures, associated with the fixed index mark 20. There is provided a three-armed contact lever 44 which is pivotally carried about a fixed axis 45 mounted on the shutter base plate indicated by the numeral 43. Such shutter base plate is not illustrated in the other figures of the drawings, but is well known per se. One arm 44a of the lever 44 cooperates with a contact pin 46 of the flash exposure contact device, said contact pin being mounted on the shutter base plate 43 and insulated from the ground and the plate. At the other arm 44b of the lever a spring 48 acts on a pin 47 and biases the lever in a counter-clockwise direction. In so doing, the spring 48 tends to cause the arm 44a to abut the fixed contact pin 46. This action of the spring 48 is counteracted by a pin 50 which is mounted on the shutter blade ring 49 and is located in the path of movement of the third arm 44c of the lever 44. With such arrangement it is possible to pivot the lever 44 counterclockwise under the action of the spring 48 only in the case of release of the shutter, when the shutter blade ring 49 is first shifted in the direction indicated by the arrow. Thus, engagement of the arm 44a with the contact pin 46 may be effected to close the contact required for flash exposures in response to such release of the shutter and movement of the shutter blade ring 49.

For the purpose of avoiding inadvertent establishment of a flash exposure contact when the exposure-value setting device 3 is in the daylight range, the said device is provided with a surface or edge 3f having a length which corresponds to the extension of the daylight range, and which is located in the path of movement of the lever arm 44b, thereby preventing counterclockwise pivoting movement of the lever 44 even when the pin 50 which is fixed on the shutter blade ring 49 has released the lever arm 44c. In order to enable flash exposures to be effected, for the flash exposure setting of the device 3, the surface 3f is followed by a recess or notch 3g which extends over the entire setting range for flash exposure of the device 3, and which has a sufficient depth to enable the lever 44 to carry out its pivoting, contact-closing movement wherein it engages the contact pin 46.

To enable settings of the diaphragm to be effected in the case of flash exposures, a diaphragm scale 51 associated with the flash exposure range is mounted on the exposure-value setting device 3, as illustrated in FIG. 1 of the drawings. The scale 51 is cooperable with an index 1a which is fixedly secured to the camera casing 1. The size of the diaphragm opening which is to be set in each case and which depends on the distance and the guide number of the flash lamp, is calculated in a manner known per se according to the formula: diaphragm number (value)=guide number (value): distance in meters.

The diaphragm scale shown in the embodiment of the invention of FIG. 1 may be dispensed with and an auxiliary distance scale may be arranged in its place, in a manner known per se. In such case, the diaphragm setting is effective by reading on the scale 19a the distance value for which the setting member 19 is adjusted, and this value is then found on the auxiliary distance scale mounted on the exposure-value setting device 3 and brought opposite the index mark 1a. Such an arrangement offers the advantage of a semi-automatic diaphragm setting in the case of flash exposure without the operator becoming conscious of the diaphragm factor. An arrangement of this kind will, therefore increase the operational simplicity of the camera provided by the invention.

In addition, a mechanical, releasable coupling device of a type well known per se may be arranged between the distance setting ring 19 of the shutter and lens assemblage 2 and the exposure-value setting device 3. Details of suitable coupling devices are shown in my Patent No. 2,944,473, Patent No. 2,924,161, and in my copending application Serial No. 837,910 corresponding to German application Serial No. G 25,322 IX/57a, filed September 17, 1958. The said coupling device will enable the exposure-value setting device to be adjusted with respect to the setting ring 19 in a manner such that an increase of the diaphragm opening is associated with an increase of distance, and vice-versa. Such a setting arrangement produces fully automatic diaphragm settings for flash exposures and results in a maximum simplicity, in a camera as provided by the invention. But this particularly simple mode of operation can only be brought about by a more costly construction; especially, it is necessary that the adjusting characteristics of the distance setting ring 19 and of the exposure-value setting device 3 correspond to one another with respect to their graduations.

For the purpose of informing the operator who has no knowledge of diaphragm numbers what the depth of focus would be as determined by the diaphragm opening and the distance, both for daylight and flash exposures, there is further provided in the present improved camera a well-known device for automatically indicating depth of focus, said device having pointers or indicators which are adjustable in response to the adjusting movement of the exposure-value setting device 3 or else the setting device for the diaphragm.

Since such depth of focus indicators are known per se, they will not be described herein in detail. Only FIG. 1 of the drawings shows pointers 52 of a depth of focus indicator or device.

Operation of the improved camera of the present invention is as follows:

For daylight exposures, the operator adjusts for film sensitivity by releasing the coupling device 25, 27 and positioning the film sensitivity ring 23 with respect to the exposure value setting ring 3, to cause the index mark 23a to indicate the proper film sensitivity value on the scale 28. The coupling device 27, 25 is then released.

Setting for distance is effected by adjustment of the distance setting ring 19, which is associated with the adjustable front lens. The scale 19a and the index mark 20 are utilized for this purpose.

The operator now aims the camera at the subject, and adjusts the exposure value setting member 3 in order to bring the tracing member 7 of the exposure meter into coincidence with the pointer or needle 4a of the photo-electric energized galvanometer of the measuring device. Turning of the exposure value setting member 3 effects simultaneous adjustment according to a predetermined plan of both the shutter speed and the diaphragm aperture, as will be understood from the foregoing description of the structures associated with these adjustments. It will be understood that during any adjustment of the exposure value setting member 3 in its daylight range, the flash contact device is open circuited or rendered inoperative as shown in FIG. 13. The camera is now ready to take the picture, as by releasing the shutter in the usual manner.

In taking of flash pictures, the exposure value setting member 3 is shifted to associate the flash portion of the scale of the member 3a with the index mark 20. For such setting of the exposure value setting member (for flash exposures), the exposure meter is rendered inoperative by the short circuiting switch 38 (FIG. 8) which is arranged across the galvanometer 42. The operator may now select the desired diaphragm value by turning the ring 3 while keeping within the flash range, using the scale 51 on the ring 3b, which is referred to the fixed index mark 1a on the camera housing. When the desired diaphragm aperture is selected and adjusted, the flash exposure may be made in the usual manner, by operation of the shutter release. Adjustment for film sensitivity, when taking flash exposures, is the same as described in connection with the taking of daylight pictures.

If a bulb or "B" exposure is to be taken, the exposure value setting member 3 is shifted to the "B" position at the remote extremity of the flash exposure range. As seen in FIG. 1, the ring 3 is turned to ring the letter "B" on the member 3a opposite the fixed index mark 20. "B" exposures are then possible. Where the camera is provided with a separate "B" setting member as indicated in FIG. 11, such setting member is adjusted to the "B" position as shown in this figure, and the exposure value setting ring 3 may now be adjusted to select any desired diaphragm opening, utilizing the scale 51 as referred to the index mark 1a. Thus, bulb exposures may be effected with any desired diaphragm aperture.

The advantages as provided by the invention, namely simplicity and clarity of operation and operational reliability are fully realized at all times, irrespective of different constructions which may be utilized in carrying out the invention and irrespective of the type of camera in which the invention is embodied.

I claim:

1. In a photographic camera, in combination, a shutter speed setting device; a diaphragm setting device; a single exposure value setting member having a relatively extensive range of movement, said range comprising an extensive daylight exposure portion and an extensive flash exposure portion, said portions being arranged successively one after the other in the said range without overlapping and having distinguishing indicia associated with them, designating their use; means coupling the single setting member to the speed setting device to effect a control over the shutter speed throughout both the daylight and flash exposure portions of the said range of movement; and means coupling the single setting member to the diaphragm setting device to effect a control of the diaphragm throughout both the daylight and flash exposure portions of the said range of movement, said coupling means and setting devices effecting a uniform gradation of exposure values throughout the said daylight and flash exposure portions of the said range.

2. The invention as defined in claim 1, in which the said range of movement includes a portion of small extent designated for "B" exposures, and in which there are means connected with the said setting member and the shutter mechanism, for effecting "B" exposures of the shutter when the member is adjusted to said portion of small extent, said portion being disposed outside of the daylight and flash exposure portions and adjoining one of the latter.

3. The invention as defined in claim 1, in which there is a separate manually operative setting device connected with the shutter mechanism for effecting "B" exposures of the shutter independently of the settings of the said single setting member.

4. The invention as defined in claim 1, in which there is an exposure meter having a measuring device, and in which there are means for effecting settings of the exposure value setting member in accordance with the response of the said measuring device.

5. The invention as defined in claim 4, in which there are means for automatically rendering inoperative the said measuring device when the setting member is on the flash-exposure portion of the said range.

6. The invention as defined in claim 4, in which there is a separate manually operative setting device connected with the shutter mechanism for effecting "B" exposures of the shutter independently of the settings of the said single setting member, and in which there are means for automatically rendering inoperative the said measuring device when the said separate setting device is adjusted to effect "B" exposures.

7. The invention as defined in claim 4, in which there are actuatable means for automatically rendering inoperative the said measuring device in response to movement of a settable member of the camera, in which the measuring device comprises a galvanometer, and in which the actuatable means comprises a short-circuiting switch connected in parallel with the galvanometer.

8. The invention as defined in claim 4, in which the exposure meter includes an indicator pointer responsive to existing light conditions, and in which the means for effecting settings of the setting member includes a tracing member arranged to be brought into coincidence with said pointer, and includes a transmission device and a control means connected thereto and associated with the exposure value setting member, said transmission device, control means and tracing member being operable over the entire range of movement of the setting member, including the daylight and flash exposure portions thereof.

9. The invention as defined in claim 1, in which there is a flash exposure contact device, and in which there are means responsive to positioning of the exposure value setting member out of the flash exposure portion of its range, for rendering inoperative the said contact device.

References Cited in the file of this patent
UNITED STATES PATENTS

| | | |
|---|---|---|
| 2,334,075 | Davenport | Nov. 9, 1943 |
| 2,351,834 | Phillips | June 20, 1944 |
| 2,464,559 | Davenport | Mar. 15, 1949 |
| 2,887,026 | Rentschler | May 19, 1959 |
| 2,917,983 | Gebele | Dec. 22, 1959 |